(12) United States Patent
Bourbonnais et al.

(10) Patent No.: US 6,338,033 B1
(45) Date of Patent: Jan. 8, 2002

(54) SYSTEM AND METHOD FOR NETWORK-BASED TELETRANSLATION FROM ONE NATURAL LANGUAGE TO ANOTHER

(75) Inventors: Jean Bourbonnais, Montreal; Martin Walker, Dollard-Des-Oreaux, both of (CA)

(73) Assignee: Alis Technologies, Inc., Quebec (CA)

( * ) Notice: Subject to any disclaimer, the term of this patent is extended or adjusted under 35 U.S.C. 154(b) by 0 days.

(21) Appl. No.: 09/294,026

(22) Filed: Apr. 20, 1999

(51) Int. Cl.⁷ .............................. G06F 17/28
(52) U.S. Cl. ............................ 704/3; 704/7
(58) Field of Search ................. 704/2–7, 277; 707/530, 536, 513; 709/223, 316, 200; 379/88, 88.14

(56) References Cited

U.S. PATENT DOCUMENTS

| | | | | |
|---|---|---|---|---|
| 4,595,980 A | * | 6/1986 | Innes | |
| 4,864,503 A | * | 9/1989 | Tolin | |
| 4,882,681 A | * | 11/1989 | Brotz | |
| 4,937,784 A | * | 6/1990 | Masai et al. | |
| 4,962,452 A | * | 10/1990 | Nogami et al. | |
| 4,964,030 A | * | 10/1990 | Suzuki et al. | |
| 5,005,127 A | * | 4/1991 | Kugimiya et al. | |
| 5,010,486 A | * | 4/1991 | Suzuki et al. | |
| 5,023,786 A | * | 6/1991 | Kugimiya et al. | |
| 5,077,804 A | * | 12/1991 | Richard | |
| 5,175,684 A | * | 12/1992 | Chong | |
| 5,268,839 A | * | 12/1993 | Kaji | |
| 5,270,928 A | * | 12/1993 | Suzuki et al. | |
| 5,295,068 A | * | 3/1994 | Nishino et al. | |
| 5,323,310 A | * | 6/1994 | Robinson | |
| 5,373,442 A | * | 12/1994 | Kutsumi et al. | |
| 5,396,419 A | * | 3/1995 | Morimoto | |
| 5,511,194 A | * | 4/1996 | Shirakata et al. | |
| 5,528,491 A | * | 6/1996 | Kuno et al. | |
| 5,535,120 A | * | 7/1996 | Chong et al. | |
| 5,541,837 A | * | 7/1996 | Fushimoto | |
| 5,583,761 A | | 12/1996 | Chou | |
| 5,587,902 A | | 12/1996 | Kugimniya | |
| RE35,464 E | * | 2/1997 | Suzuki et al. | |
| 5,636,376 A | | 6/1997 | Chang | |
| 5,701,497 A | | 12/1997 | Yamauchi et al. | |
| 5,712,901 A | | 1/1998 | Meermans | ................ 379/88.14 |

(List continued on next page.)

FOREIGN PATENT DOCUMENTS

| | | | | |
|---|---|---|---|---|
| EP | 0 867 815 A2 | 9/1998 | ........... G06F/17/28 |
| JP | 10269223 | 10/1998 | ........... G06F/17/28 |

OTHER PUBLICATIONS

Minako O'Hagan: "Translating in cyberspace: the coming industry of teletranslations" Aslib Proceedings, vol. 47, No. 2, Feb. 1995, pp. 41–46 XP000612596.

*Primary Examiner*—Patrick N. Edouard
(74) *Attorney, Agent, or Firm*—Howrey Simon Arnold & White; Michael J. Bell (57) ABSTRACT

A network-based teletranslation system and method for translating documents from one natural language to another natural language. The teletranslation system and method are capable of handling a wide variety of formats, including HTML documents from the Internet, intranets or extranets, e-mails, or electronic documents from a word processor or other applications. The teletranslation system and method are compatible with various MT engines and human translation services, and use the computing power of a network in a scalable and flexible way. The teletranslation system and method improve bandwidth and speed by distributing the workload among several computers in the network.

25 Claims, 6 Drawing Sheets

U.S. PATENT DOCUMENTS

| | | |
|---|---|---|
| 5,715,466 A | 2/1998 | Flanagan et al. |
| 5,734,903 A | 3/1998 | Saulpaugh et al. .......... 709/316 |
| 5,751,957 A | 5/1998 | Hiroya et al. |
| 5,774,660 A | 6/1998 | Brendel et al. |
| 5,774,668 A | 6/1998 | Choquier et al. |
| 5,778,182 A | 7/1998 | Cathey et al. |
| 5,778,228 A | 7/1998 | Wei |
| 5,802,539 A | 9/1998 | Daniels et al. |
| 5,826,244 A | 10/1998 | Huberman .................... 705/37 |
| 5,828,990 A | 10/1998 | Nishino et al. |
| 5,862,321 A | 1/1999 | Lamming et al. ............ 709/200 |
| 5,867,651 A | 2/1999 | Dan et al. .................... 709/203 |
| 5,890,138 A | 3/1999 | Godin et al. ................... 705/26 |
| 5,963,966 A | 10/1999 | Mitchel et al. ............. 707/518 |
| 5,987,508 A | 11/1999 | Agraharam et al. ......... 709/217 |
| 6,073,143 A | 6/2000 | Nishikawa et al. .......... 707/513 |

\* cited by examiner

- ASMO-708-FR
- ASMO-708-Plus
- Big5
- CP437
- CP737
- CP775
- CP850
- CP852
- CP853
- CP855
- CP857
- CP860
- CP861
- CP863
- CP864
- CP865
- CP866
- CP869
- EUC-JP

- GB2312
- HZ
- ISCII
- ISIRI-3342
- ISO-2022-JP
- ISO-2022-KR
- ISO-8859-1
- ISO-8859-2
- ISO-8859-3
- ISO-8859-4
- ISO-8859-5
- ISO-8859-6
- ISO-8859-7
- ISO-8859-8
- ISO-8859-8-I
- ISO-8859-9
- ISO-8859-15
- Jawi-Al-Arabi
- Kamenicky

- KOI8
- KOI8-R
- KSC5601
- Macintosh Arabic
- Macintosh Croatian
- Macintosh Cyrillic
- Macintosh Eastern Eur.
- Macintosh Greek
- Macintosh Icelandic
- Macintosh Roman
- Macintosh Romanian
- Macintosh Turkish
- Macintosh Ukrainian
- MS_1368
- Murasu
- Mylai
- Shift-JIS
- TamilNet
- TIS-620

- UCS-2
- US-ASCII
- UTF-7
- UTF-8
- VISCII
- VIQR
- VNCII
- VietNet
- Windows 1250
- Windows 1251
- Windows 1252
- Windows 1253
- Windows 1255
- Windows 1255-V
- Windows 1256
- Windows 1257
- Windows 1258

SYSTEM AND METHOD FOR NETWORK-BASED TELETRANSLATION FROM ONE NATURAL LANGUAGE TO ANOTHER

BACKGROUND OF THE INVENTION

I. Related Applications

This application is related to concurrently filed applications titled, "System and Method for Enhancing Document Translatability" Ser. No. 09/294,028, commonly assigned, and "System and Method for Internet-based Translation Brokerage Services", Ser. No. 09/294,027 commonly assigned, and incorporates the commonly assigned applications by reference in their entirety for all purposes.

II. Field of the Invention

The present invention relates generally to language translation and, more specifically, to a system and method for network-based teletranslation.

III. Description of the Related Art

Today, as more and more businesses operate across international borders, they are often required to conduct business in more than one language. Also, businesses often encounter a need to translate documents from one natural language to another natural language.

In the past, businesses have utilized human-based translation (HT) to translate documents. Although HT generally produces high quality work, it is labor intensive, inherently slow, and often expensive. Human translators are quite often specialists in a given language pair (e.g., English/French). Hence, there is a limitation on how the human translators can be allocated to different translation tasks, thus resulting in certain rigidity for a business employing the human translators.

Because HT is labor intensive, it is difficult to scale up when need increases and difficult to scale down when need decreases. The capacity of any group of translators is fairly well defined. When a sudden need arises to increase the capacity for a particular language pair, adding additional translators to the process creates various problems, such as harmonizing different styles, sharing glossaries and context information, and merging translated text. Moreover, it can be difficult to hire additional translators when a sudden need arises.

The document to be translated is often submitted to the translators in different formats, for example, computer printouts, faxes, word processing files, e-mail attachments, web pages. The translators are then left to handle the formats and extract translatable contents. While requesters of translation services prefer that the translated document be in the same format as it was originally submitted, this is often not possible, because different translators have varying technical skills and often are unable to reformat the translated document into the original format.

For these reasons, machine translation software programs, also known as machine translation engines, have been developed to provide computerized translations. Today, the term Machine Translation (MT) is widely used in the industry to refer to computerized systems that translate documents from one natural language to another, with or without human assistance. It is important to note that the term MT does not include computer-based tools that support translators by providing access to dictionaries and terminology databases, or tools that facilitate the transmission and reception of machine-readable texts, or tools that interact with word processing, text editing or printing equipment. The term MT does, however, include systems in which translators or other users assist computers in the production of translations, including combinations of text preparation, on-line interactions and subsequent revisions of machine translated documents.

While MT engines appear promising, the technology is often under-used or miss-used. Businesses frequently encounter difficulty in determining the right use of MT and to evaluate the cost/benefit of MT. Businesses require a level of technical expertise to use MT (for example, computer, software and/or system management expertise), which is often not available. Access to various MT functionalities is not integrated with routine translation tasks in a business, making its use irregular at best. Businesses unfamiliar with MT may not be aware that there is not one best MT engine for their particular business, but rather, the suitability of any particular MT engine depends on the application, which often varies even within a given business. Consequently, a business may acquire a MT engine that is sub-optimal for its need.

MT engines often translate documents of only certain types of computer formats. For example, some MT engines accept rich text format (RTF) only, while others accept only ASCII files. As a result, businesses often are forced to turn down translation jobs because their MT engines cannot handle a particular computer format or at best implement a non-trivial way of extracting the text for translation from the format information and reinserting the translated text back into the format information.

MT engines typically have a limited bandwidth, i.e., the amount of text they can translate in a given time period. If a business needs additional machine translation bandwidth, it must buy and setup additional MT engines. However, the ability to dispatch translation jobs to various MT engines and balance the workload among the MT engines is not a trivial task. Failure to balance the workload among various MT engines results in under-performing equipment. More specifically, failure to balance the workload properly among various MT engines considerably slows down the time required to translate a document when compared to the combined output of the separate MT Engines. On the other hand, failure to provide the necessary translation bandwidth to users results in lower productivity.

Even if businesses acquire new MT engines to meet increased demand or the need for new language pairs, the new MT engines are often incompatible with each other. Thus, businesses simply cannot connect a new MT engine to their existing environment. The new MT engines are often not interchangeable with the old MT engines, and often do not work alongside the old MT engines.

For these reasons, it has been recognized that there is a need for a teletranslation system and method that is capable of handling a wide variety of language pairs and computer formats. There is a need for a teletranslation system and method that is compatible with various MT engines, and that uses the computing power of the network in a scalable and flexible way. There is a need for a teletranslation system and method that increases the bandwidth and speed by distributing the workload among several computers in the network in a balanced way.

SUMMARY OF THE INVENTION

The present invention is a network-based teletranslation system and method that translates documents from one natural language to another natural language. In one embodiment, the teletranslation system comprises a client application layer having a plurality of client applications, the client application layer receiving translation documents from one or more software applications and outputting a translated text, a server layer having a plurality of servers, each server having a plurality of filters, the server layer calling a plurality of filters in an appropriate order based on the translation request and existing parameters, each filter preprocessing a translation document to facilitate further preprocessing by subsequent filters, at least one of the filters processing the translation request and returning the translated document, and an intermediate layer coupling the client application layer to the server layer and arbitrating the translation documents among the servers in the server layer, wherein the teletranslation system handles a wide variety of language pairs and formats, and wherein the teletranslation system utilizes the computing power of the network in a scalable and flexible way, and wherein the teletranslation system increases the bandwidth and speed by distributing the translation request among the servers in the network.

In one embodiment, the present invention is a network-based filter architecture embodied in a teletranslation system for translating documents from one natural language to another. The filter architecture comprises one or more atomic filters each programmed to perform a specific task, one or more aggregate filters constructed by combining other filters, the aggregate filters analyzing the translation request and calling the other filters, and one or more load-balancing filters for distributing the translation request among aggregate filters to increase the speed of the teletranslation system and optimizing the computing power of the network.

In one embodiment, a method for translating documents from one natural language to another by a network-based teletranslation system comprises the steps of receiving the translation documents at a client application layer having a plurality of client applications and outputting translated documents, calling a plurality of filters at a sever layer in an appropriate order based on the translation documents and existing parameters, the server layer having a plurality of servers, preprocessing a translation document at each filter to facilitate further preprocessing by subsequent filters, translating a translation document at a machine translation engine in the server layer and returning the translated document, and arbitrating the translation documents by an intermediate layer among the servers.

In one embodiment, a method for translating documents from one natural language to another by a network-based teletranslation system comprises the steps of receiving the translation documents at a client application layer having a plurality of client applications and outputting translated documents, calling a plurality of filters at a sever layer in an appropriate order based on the translation documents and existing parameters, the server layer having a plurality of servers, preprocessing a translation document at each filter to facilitate further preprocessing by subsequent filters, translating a translation document through a human translation service accessed via a server in the server layer and returning the translated document, and arbitrating the translation documents by an intermediate layer among the servers.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The present invention is a system and method for teletranslation that translates a document from one natural language to another. The teletranslation system and method is capable of handling a wide variety of formats, including HTML documents from the Internet, intranets or extranets, e-mails, or electronic documents from a word processor or other applications. The teletranslation system and method is compatible with various MT engines and human translation services, and uses the computing power of a network in a scalable and flexible way. The teletranslation system and method increases the bandwidth and speed by distributing the workload among several computers in the network.

In one embodiment, a user selects translation parameters through a user interface, such as a target language and the quality of translation. The system processes the request based on the selected parameters, either through automated translation and editing tools, or through a human translation service. The user automatically receives back the translated text in the same format as the original text.

Among the several parameters are translation request parameters, system-level parameters, system load conditions, system error conditions, number of words translated for each language pair, average performance of filters, and spare bandwidth capacity or lack thereof of the filters.

Figure 1:
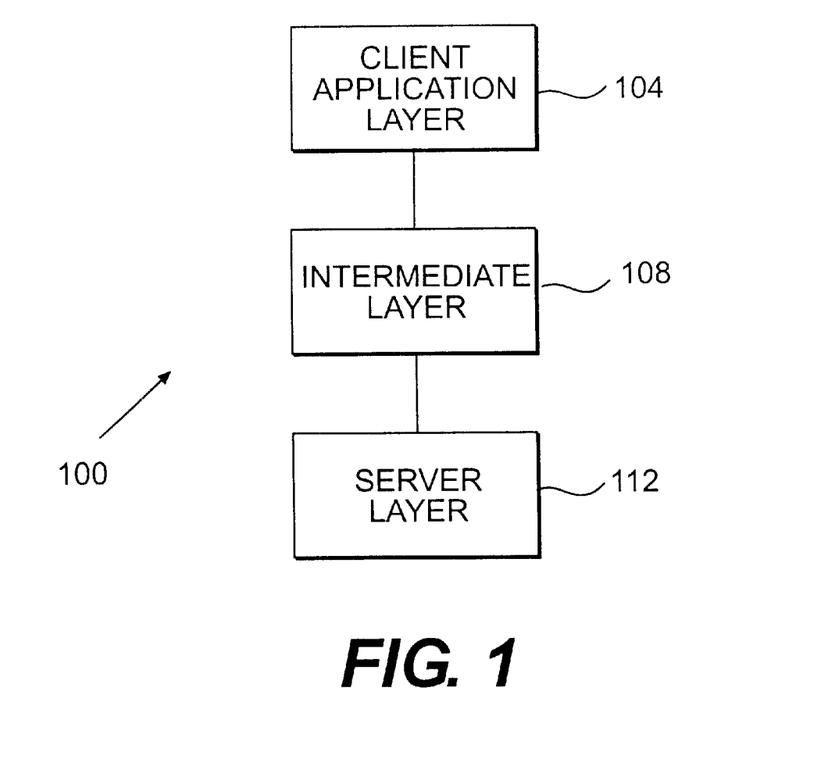
FIG. 1 is a block diagram of one embodiment of the teletranslation system.

FIG. 1 is a block diagram of one embodiment of the teletranslation system. As shown in FIG. 1, the teletranslation system 100 comprises three layers: a client application layer 104; an intermediate layer 108; and a server layer 112.

The client application layer 104 receives translation requests from software applications interacting with the user and outputs a corresponding translated text. The client application layer 104 can contain a commercially available application that is translation enabled via such apparatus as plug-ins, such as Microsoft Word, Microsoft Explorer, Netscape Navigator, Lotus Notes, SAP Enterprise Applications, etc.

The intermediate layer 108 couples the client application layer 104 to the server layer 112. In one embodiment, the intermediate layer 108 is implemented as a distributed object architecture. In one embodiment, the intermediate layer 108 has two main elements: an application-programming interface (API) and a set of filter base classes. The filter base classes provide a common interface between the intermediate layer 108 and the server layer 112. The filter base classes integrate the linguistic and text processing functionality of the system. In one embodiment, a TCP/IP protocol couples the API to the filter base classes. The intermediate layer 108 arbitrates translation requests among various filters and servers in the server layer 112.

The intermediate layer 108 supports multiple clients and multiple filter configurations simultaneously. The intermediate layer 108 distributes the load efficiently among various filters in order to minimize translation times.

The intermediate layer 108 comprises means for detecting availability of individual filters over the network. Also, the intermediate layer 108 comprises means for detecting filter failures, means for reporting the failure, and means for correcting the failure, i.e., replacing, restarting, rebooting, ignoring. Furthermore, the intermediate layer 108 comprises means for querying the state (on, off, load-level, number of errors, average throughput, etc.) of various filters and means for controlling the state of the various filters. These means are constructed through various interfaces of the filter object and available through the API. These means are also referred to as mechanisms or modules. Thus, the means for detecting filters, for example, is interchangeably referred to as a filter detection module or a filter detection mechanism. In one embodiment, the filter detection mechanism is an object locator that runs at the API level and uses various network communication technologies to locate and bind to the various filters on the network. To be able to do so, the filter base class implementation is able to respond to network wide calls from the object locator. Another implementation can have an object broker that can query for all the filters and cache the filter location locally to give faster response to the object locator. In one embodiment, the means for detecting filter failure in a linguistic tool is to monitor the process in which it runs. If it is detected that the process is frozen or no longer running, then it is automatically killed and restarted. Also, this is reported to the user and/or administrator. In one embodiment, the means for querying and the means for controlling the state of the filters are linguistic tool dependent, but in general they bind query and control parameters to operational parameters of the linguistic tools themselves. In one embodiment, these means are generic mechanisms for obtaining information about the linguistic tool and controlling it. The construction of the other means or modules are well known in the art.

The server layer 112 comprises one or more filters or combinations of filters via an aggregate filter. A filter is an object (or program) that is created to perform a specific function, such as translate a text from one natural language to another, remove certain tags from the text, etc. In operation, a server assembles (or calls) a group of filters in a selected order based on the type of translation request. Each filter preprocesses a translation request or a portion thereof to facilitate further preprocessing by subsequent filters. Finally, the translation request is translated by a given MT engine or human translation service.

Figure 2A:
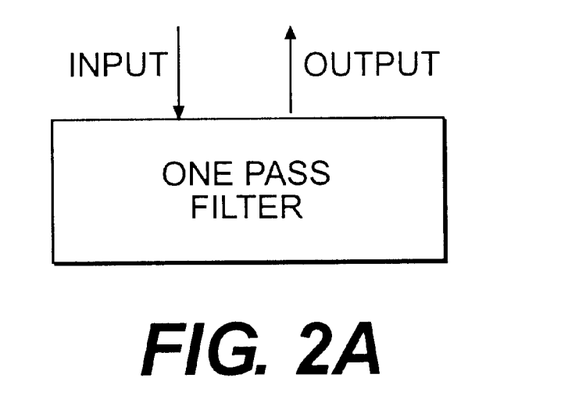
FIG. 2A illustrates a one-pass filter.
Figure 2B:
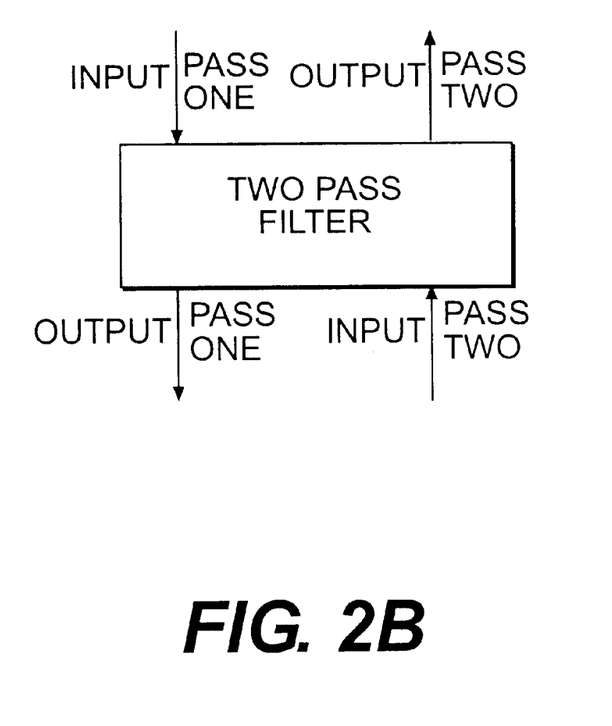
FIG. 2B illustrates a two-pass filter.

In general, filters can be broadly classified into two categories: one-pass filters, and two-pass filters. FIG. 2A illustrates a one-pass filter. A one-pass filter has a single input terminal and a single output terminal. FIG. 2B illustrates a two-pass filter. A two-pass filter has a first pass comprising a first input-output terminal pair and a second pass comprising a second input-output terminal pair.

Figure 3:
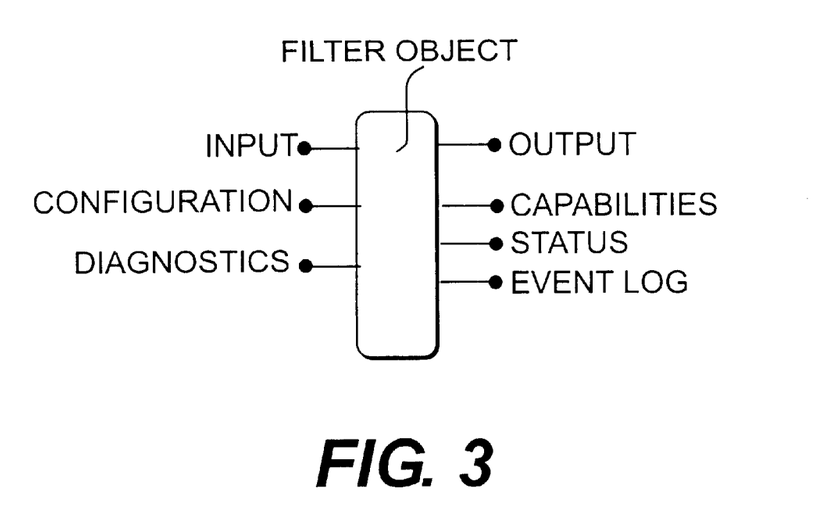
FIG. 3 illustrates various interfaces in a filter.

In one embodiment illustrated in FIG. 3, each filter provides the following interfaces.

(i) Input Interface: The input interface receives data.
(ii) Output Interface: The output interface outputs data that is processed by the filter.
(iii) Configuration Interface: The configuration interface allows the system to configure the filter from a remote location, such as update glossaries from a remote location.
(iv) Capabilities Interface: A filter provides information through this interface about its capabilities.
(v) Status Interface: A filter provides the status of a job, such as position in the queue, wait time before processing, percentage of work done, etc.
(vi) Event Log Interface: A filter provides event logs via this interface.
(vii) Diagnostic Interface: Remote diagnostics of a filter can be performed via the diagnostic interface. In one embodiment, each filter has a loop-back capability that allows debugging, diagnostics and performance testing. Each filter provides a mechanism to enable and disable trace logs for debugging purposes.

The filters are classified into three broad classes based on their functionality. These are atomic filters, aggregate filters, and load-balancing filters.

1. Atomic Filter

At the lowest level in the server layer, atomic filters perform a specific function on a document. As noted before, an atomic filter is a program (i.e., object) that performs a specific task. In one embodiment, third party tools and/or services (whether linguistic or other) are wrapped within the atomic filters. All data processing functionality are performed in the atomic filters. The atomic filters can be combined in various orders and packages.

There are many different types of atomic filters. Each atomic filter is programmed to perform a specific type of task. Some of the atomic filters used in the present invention are described below. It should be understood that there are many additional types of atomic filters that are not described in this document, but that they can be implemented in the present invention depending on the type of translation request. The actual implementation of different atomic filters is well known in the art, and thus, will not be described in this document.

(i) Language and Code Set Detection Filter

The Language and Code Set Detection Filter detects the language and code set of the document. This filter is called upon when the language and/or code set of a document is unknown to the system. In one embodiment, this filter supports the languages and code sets listed in Table I below. It should be understood that the Language and Code Set Detection Filter can be configured to support other languages and code sets that are not listed in Table I.

| Language | Abbr. | Suitable Code Sets |
|---|---|---|
| Albanian | sq | cp1252; cp850; Macintosh; utf8 |
| Arabic | ar | cp1256; iso 8859-6; utf8 |
| Basque | eu | Cp1252; cp850; Macintosh; utf8 |
| Bulgarian | bg | Cp1251; iso 8859-5; utf8 |
| Chinese | zh | gb2312; hz; big5; utf8 |
| Croatian | sh | Cp1250; iso 8859-2; Macintosh-Croat; utf8 |
| Czech | cs | Cp1250; iso 8859-2; utf8 |
| Danish | da | Cp1252; cp850; Macintosh; utf8 |
| Dutch | nl | Cp1252; cp850; Macintosh; utf8 |
| English | en | Cp1252; utf8 |
| Estonian | et | Iso 8859-4; utf8 |
| Finnish | fi | Cp1252; cp850; Macintosh; utf8 |
| French | fr | Cp1252; cp850; Macintosh; utf8 |
| German | de | Cp1252; cp850; Macintosh; utf8 |
| Greek | el | Cp1253; cp869; iso 8859-7; Macintosh-Greek; utf8 |
| Hungarian | hu | Cp1250; cp852; utf8 |
| Italian | it | Cp1252; cp850; Macintosh; utf8 |
| Japanese | ja | euc-jp; iso 2022-jp; shift-jis; utf8 |
| Korean | ko | Ks c 5601; iso 2022-kr; utf8 |
| Malay | ms | Cp1252; cp850; Macintosh; utf8 |
| Norwegian | no | Cp1252; cp850; Macintosh; utf8 |
| Polish | pl | Cp1252; iso 8859-2; utf8 |
| Portuguese | pt | Cp1252; cp850; Macintosh; utf8 |
| Russian | ru | Cp1251; iso 8859-5; koi8-r; utf8 |
| Spanish | es | Cp1252; cp850; Macintosh; utf8 |

-continued

| Language | Abbr. | Suitable Code Sets |
|---|---|---|
| Swedish | Sv | Cp1252; cp850; Macintosh; utf8 |
| Thai | Th | Tis 620; utf8 |
| Turkish | Tr | Cp853; iso 8859-9; utf8 |

(ii) Code Set Conversion Filter

Figure 4:
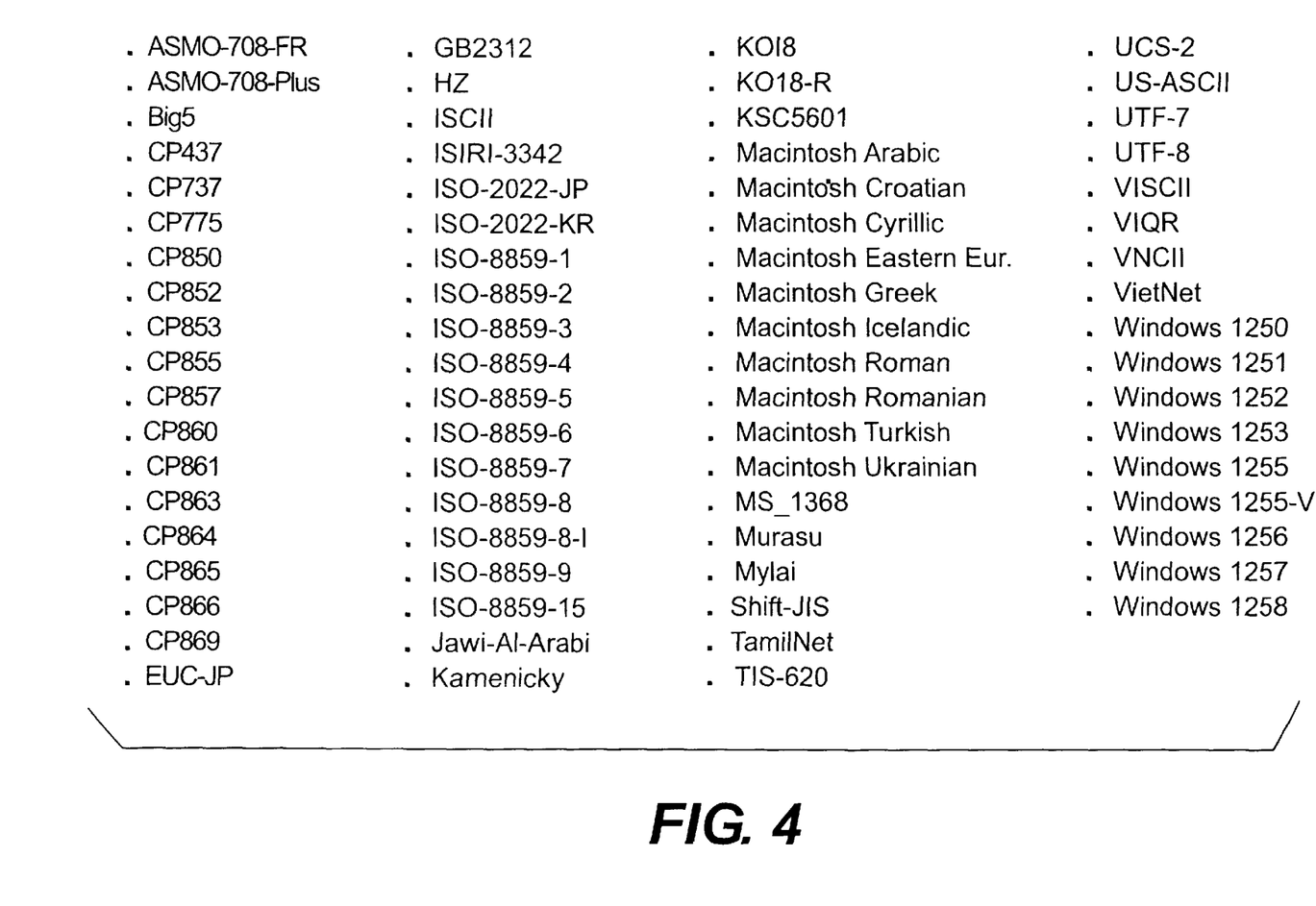
FIG. 4 lists a sample of code sets supported by the teletranslation system.

The Code Set Conversion Filter converts a code set to another code set. FIG. 4 lists a sample of code sets supported by the code set conversion filter. It should be understood that the filter can be configured to support other code sets.

(iii) HTML Clean-Up Filter

The HTML Clean-Up Filter removes non-standard HTML constructs before they are processed by the system. This filter also ensures that HTML tags are not embedded inside words. If HTML tags are embedded inside words, they may be misinterpreted by MT engines and translated as part of the data.

(iv) File Format Conversion Filter

The File Format Conversion Filter converts a translation request document to and from an internal data format to preserve the original formatting of the document after translation. In one embodiment, this filter supports the following file formats: plain text; HTML; OTEXT; Microsoft Word RTF; Microsoft Word DOC; and Adobe Acrobat PDF. It will be apparent to one skilled in the art that the File Format Conversion Filter can be configured to support other file formats.

(v) Summary Filter

The Summary Filter generates a summary of a document. Based on the summary, a user may determine that the document is not relevant, and thus a full translation of the document is not necessary. Also, the user may conclude, based on the summary, that machine translation should probably meet his quality requirements in this specific case, and thereby decide to forego a costly and time consuming human translation of the document.

(vi) Language Marker Filter

The Language Marker Filter detects whether any part of a document is of a different language than the source text. If so, this filter tags that part of the text for non-translation. In one embodiment, the tagged text can be translated using a MT engine supporting the necessary language pair, if available.

(vii) Reaccentuation Filter

The Reaccentuation Filter provides accented characters, where appropriate, in text written in a language with accents where in fact the user has omitted the accents, for example while using an English keyboard to type French text. This filter improves the quality of translation by ensuring that words are properly accented.

(viii) Spell Checker Filter

The Spell Checker Filter corrects misspelled words automatically where there is no ambiguity and interactively where these is, thus improving the quality of translation.

(ix) Grammar Checker Filter

The Grammar Checker Filter corrects the text automatically where there is no ambiguity and interactively where these are. Improper grammar confuses MT engines and produces poor quality translation. This filter ensures that the grammar is correct so that the MT engines can better translate the text.

(x) Controlled Language Filter

The Controlled Language Filter corrects the style of the text where appropriate and where there is no ambiguity. This filter ensures that the text adheres to a particular language style, thus guaranteeing consistent translations.

(xi) Linguistic Tag Filter

The Linguistic Tag Filter tags words that should not be translated by MT engines or should at least be treated differently. For example, this filter tags names of persons, geographical names, dates, and addresses.

(xii) Do Not Translate Filter

The Do Not Translate Filter tags a particular set of words, for example, proper nouns, that should not be translated. In one embodiment, this filter tags a particular set of words supplied prior to or with the translation request as not to be translated.

(xiii) Pre-Translate Filter

The Pre-Translate Filter translates words that are specific to the document being processed. This filter tags words appropriately so that MT engines will not attempt to translate these words. In one embodiment, this filter translates a particular set of words supplied prior to or with the translation request and where there is no ambiguity in the translation.

(xiv) Translation Memory Filter

The Translation Memory Filter only translates text for which it has an appropriate translation already in its database, and marks it non-translatable. The translation memory alone is not sufficient to translate a complete text. In concert with MT engines, this filter produces a higher quality translation.

(xv) MT Engine Filter

The MT Engine Filter corrects any idiosyncrasies that MT engines may have (e.g., rearrange dates, remove hyphens, insert too many spaces, etc.) and submits the text to the MT Engines themselves. This filter manages the list of words that the MT Engine cannot translate. This list is preserved with reference to the original document along with the data and time the request was processed.

In one embodiment, the MT Engine Filter has a configuration parameter to disable any call to the corresponding MT engine and pass the data back to the client application. This filter also has a configuration parameter to limit the number of concurrent requests per language pair. When this number of concurrent requests reaches the limit, the MT engine sends a "server too busy" response to the client application. As noted before, the MT engines perform the bulk of the translation in the case where the user has requested MT in the translation request. These MT engines are commercially available and are manufactured by various vendors. It is important to note that the MT engines are also considered as atomic filters. According to the present invention, the atomic filters pre-process the data in a predetermined order, and provide the pre-processed data to the MT engine. Thus, the atomic filters work in concert with the MT engines to provide a high quality translation. Each atomic filter performs a specific task. Many of these atomic filters and their functionality have been described above. The present invention assembles a variety of atomic filters along with the MT engines to provide a high quality translation.

(xvi) Human Translation Services Filter

The Human Translation Services Filter performs the translation in the case where the user has requested HT in the translation request. The HT Services Filter takes care of submitting, via the network, the translation document to a human translation service and of tracking its return.

2. Aggregate Filter

An aggregate filter is built from a combination of other filters. The types of filters in the aggregate filter depend on the translation request. The aggregate filter analyzes a translation request and determines which filters are needed to perform the particular translation task. The aggregate filter may assemble atomic, load balancing and even other aggregate filters.

In one embodiment, the aggregate filter is a generic implementation that is totally configurable. It accepts a list of filters and the order in which they must be called as well as the location of the filter objects. The aggregate filter offers all the functionality offered through the interfaces of the various filters it assembles.

Figure 5:
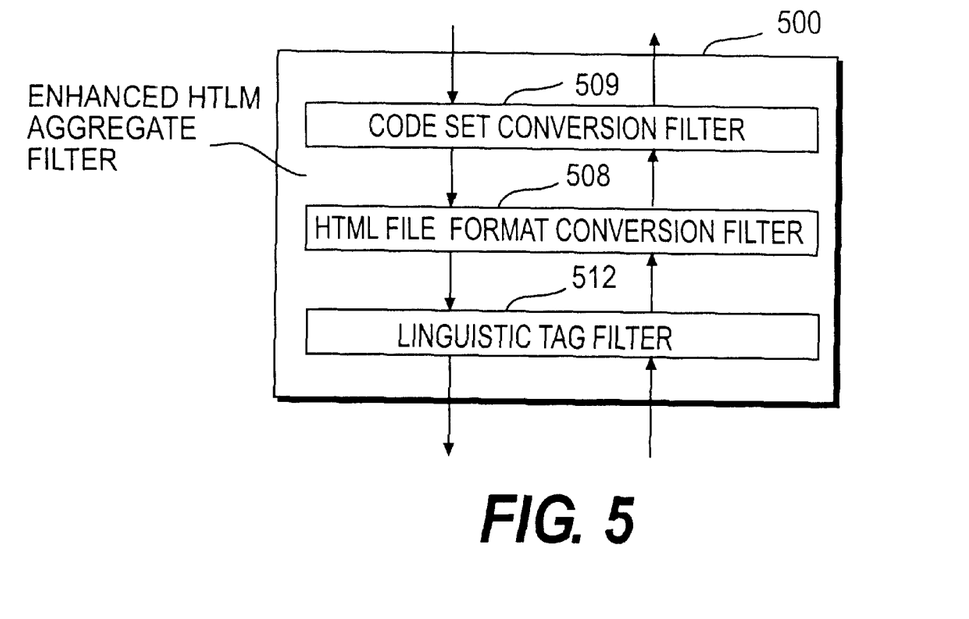
FIGS. 5 and 6 illustrate two variations of an aggregate filter.
Figure 6:
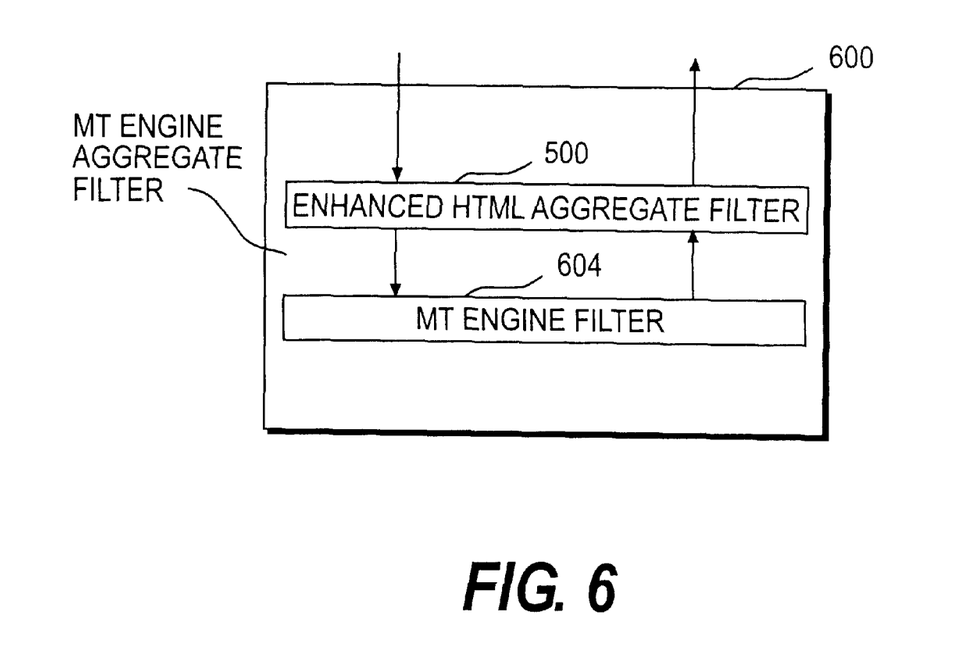

FIGS. 5 and 6 illustrate two variations of the aggregate filter in accordance with the present invention. Referring now to FIG. 5, an aggregate filter 500 is assembled with the following atomic filters: a code set conversion filter 504; a HTML file format conversion filter 508; and a linguistic tag filter 512. As will be realized, these atomic filters are two-pass filters. In the first pass, each atomic filter preprocesses the data and provides the data to the next atomic filter. Thus, the resulting aggregate filter 504 is in fact a two-pass filter. An external MT engine filter will eventually receive the data, translate the data, and return the data to the last atomic filter. The atomic filters in a reverse order process the data in their second pass.

Referring again to FIG. 5, in the first pass, the code set conversion filter 504 receives the data, converts the code, and outputs the data. Next, the HTML file format conversion filter 508 receives the data, removes non-standard HTML constructs, converts the HTML text to an internal data format, and outputs the data. Next, the linguistic tag filter 512 receives the data, tags words that should not be translated by the MT engine or should otherwise be treated differently, and provides the data to an external MT engine filter. The MT engine filter translates the text from one natural language to another, and returns the translated text to the linguistic tag filter 512.

In the second pass, the linguistic tag filter 512 removes the tags that were added in the first pass, and provides the data to the HTML file format conversion filter 508. The HTML file format conversion filter 508 converts the text in the internal data format back to its HTML format based on data generated in the first pass and returns the data to code set conversion filter 504. Code set conversion filter 504 converts the text back to the original code set and outputs the data.

Referring now to FIG. 6, an aggregate filter 600 is assembled with the aggregate filter 500 and the MT engine filter 604. Thus, FIG. 6 shows that an aggregate filter can be constructed using another aggregate filter and any other filters.

3. Load-Balancing Filter

At the highest level in the server layer, load-balancing filters divide the processing load among other filters of the same nature, including other load-balancing filters. The load-balancing filters divide the processing load in a way that provides a maximum throughput and increases the speed of the teletranslation system. Translation requests are dispatched to other filters in an intelligent fashion, such as according to processing power and current load.

Figure 7:
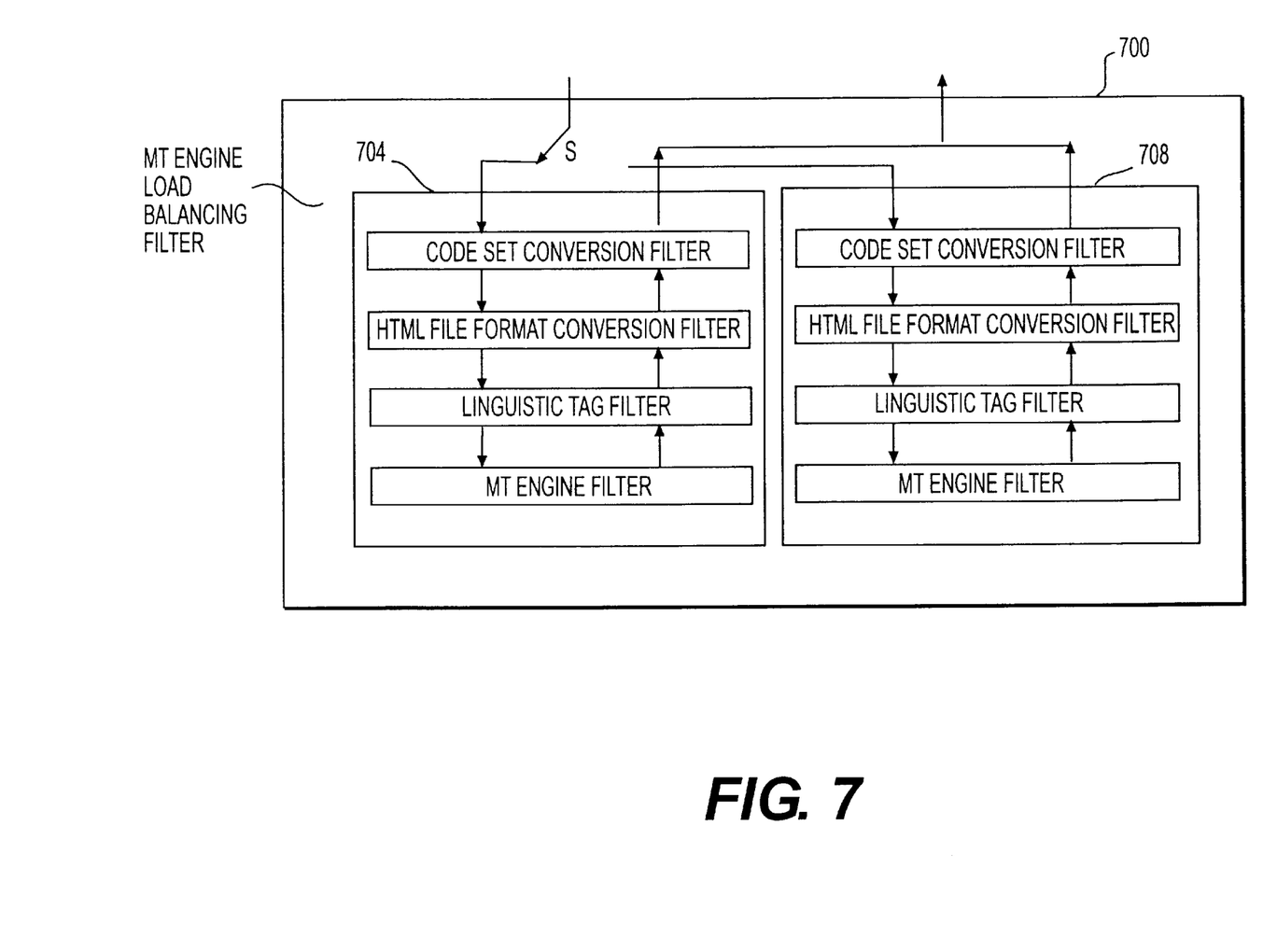
FIG. 7 illustrates a load-balancing filter.

FIG. 7 illustrates a load-balancing filter 700. Load-balancing filter 700 comprises aggregate filters 704 and 708. The aggregate filters 704 and 708 have identical construction and are constructed like the aggregate filter 500.

In one embodiment, a two-state switch S connects the load-balancing filter 700 to the server. In its first state, the switch S connects the aggregate filter 704 to the server layer while it disconnects the aggregate filter 708 from the server layer. Thus, in the first state, the translation request is routed through the aggregate filter 704. In its second state, the switch S connects the aggregate filter 708 to the server layer while it disconnects the aggregate filter 704 from the server layer. Thus, in the second state, the translation request is routed through the aggregate filter 708. The switch S selects either the aggregate filter 704 or aggregate filter 708 depending on their current workload, maximum capacity, and other conditions.

The filter architecture according to the present invention allows any MT engine and/or any HT services to be added to the teletranslation system. Thus, a business can add new MT engines and/or any HT services as needed. The filter architecture of the present invention optimizes the use of the MT engines and/or any HT services by performing a variety of pre-processing ("first-pass") or post-processing ("second-pass") functions. The filter architecture allows the filters to be interchangeable based on the nature of their inputs and outputs. In other words, filters act like black boxes that are defined in terms of their input and output rather than in terms of their internal process.

In one embodiment, the teletranslation system includes means for "chunking", which means dividing a large translation request into small chunks inside an aggregate filter. The means for chunking can be a chunking filter, which is a type of an atomic filter. The chunking filter divides the translation request into small chunks and supplies the chunks to a MT engine. This way, if data is lost in the MT engine during the translation (for example, because of a flaw in the MT engine causing it to abort once in a while), only a given chunk of data, and not the entire large translation request, is lost.

In another embodiment, the chunking mechanism above will permit a filter to start processing the data without receiving the full text of the document. Since, the translation is done by processing chunks of data, users can obtain faster feedback regarding the progress of the translation work as each filter completes its portion of the translation work. In fact, users can receive updates while the client application layer has yet to feed the entire translation request.

Figure 8:
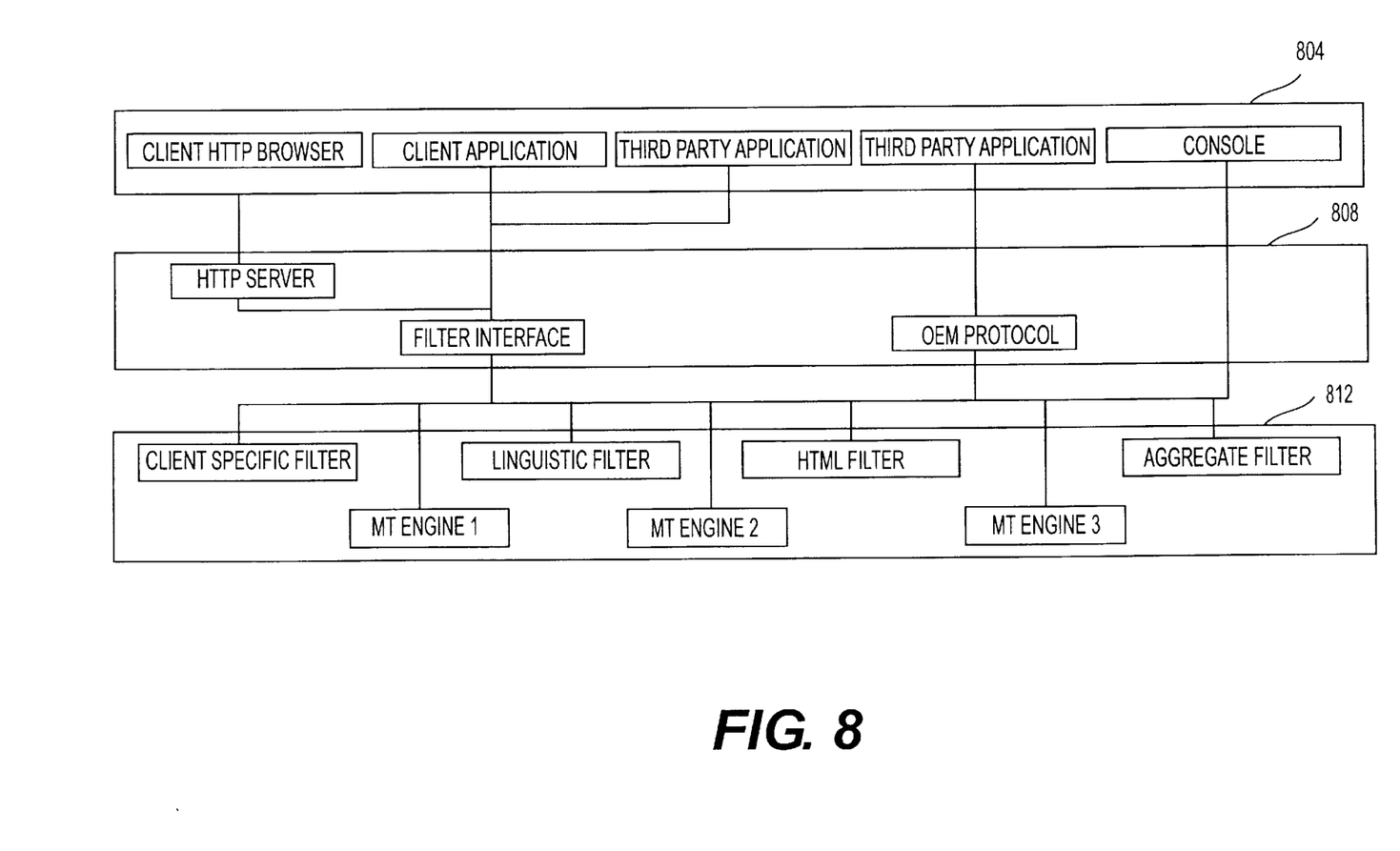
FIG. 8 illustrates the distributed architecture of the teletranslation system.

FIG. 8 illustrates the distributed architecture of a teletranslation system 800 in accordance with one embodiment of the present invention. A client application layer 804 comprises a client HTTP Browser, a console and other client applications.

An intermediate layer 808 comprises an HTTP server, a filter interface and an OEM protocol. A server layer 812 comprises several filters, including a linguistic filter, an HTML filter, an aggregate filter, and various MT Engine filters. Each filter can reside in a separate computer, but they are not required to do so.

The distributed architecture of the present invention provides a flexible and scalable way to utilize the computing power of computers in the network. In the present invention, multiple translation requests can be accepted from various sources on a network. The translation requests can be dispatched among those computers that have been identified as having the necessary translation capabilities, i.e., available bandwidth, processing speed, etc.

The teletranslation system and method in accordance with the present invention accepts documents having a variety of different formats. Using the File Format Conversion Filter, the teletranslation system converts a translation request document as necessary for processing by the various filters and returns it after in its original format.

In an embodiment where the invention is implemented using software, the software may be stored in a computer program product and loaded into a computer system using a removable storage drive or a hard drive. The software may be stored in a CD-ROM, a floppy disk or any other type of storage device.

In another embodiment, the invention can be implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A network-based teletranslation system for translating documents from one natural language to another, comprising:
   a client application layer having a plurality of client applications, the client application layer receiving translation documents from one or more software applications and outputting translated documents;
   a server layer having a plurality of filters, the server layer calling a plurality of filters in an appropriate order based on the translation documents and existing parameters, the filters preprocessing the translation documents to facilitate further preprocessing by subsequent filters, the server layer having a plurality of machine translation engines for translating the translation documents and returning the translated documents; and
   an intermediate layer coupling the client application layer to the server layer and arbitrating the translation documents among the filters in the server layer;
   wherein the teletranslation system is capable of handling a wide variety of formats and utilizes a computing power of the network in a scalable and flexible way, and wherein a bandwidth and the speed of the teletranslation system is increased by distributing translation requests among servers in the network.

2. The network-based teletranslation system as recited in claim 1, wherein the client application layer further comprises interfaces and plug-ins adapted to the software applications.

3. The network-based teletranslation system as recited in claim 1, wherein the intermediate layer further comprises:
   a distributed object application programming interface; and
   a detection module for detecting availability of filters in the network.

4. The network-based teletranslation system as recited in claim 1, wherein the intermediate layer supports multiple clients and multiple filter configurations simultaneously.

5. The network-based teletranslation system as recited in claim 1, wherein the intermediate layer distributes a workload among various filters in order to minimize translation times.

6. The network-based teletranslation system as recited in claim 1, the intermediate layer further comprising:
   detection modules for detecting filter failures;
   reporting modules for reporting the failures; and
   correction modules for correcting the failures.

7. The network-based teletranslation system as recited in claim 1, the intermediate layer further comprising:
   query modules for querying the state and capabilities of various filters; and
   control modules for controlling the state of the various filters.

8. The network-based teletranslation system as recited in claim 1, the existing parameters include translation request parameters, system-level parameters, system load conditions and system error conditions.

9. A network-based filter architecture embodied in a teletranslation system for translating documents from one natural language to another, the filter architecture utilizing a computing power of the network in a scalable and flexible way, and increasing the bandwidth and speed of the teletranslation system by distributing a translation request among various filters in the network, the filter architecture comprising:
   one or more atomic filters each programmed to perform a specific task;
   one or more aggregate filters constructed by combining other filters, the aggregate filters analyzing the translation request and calling the other filters; and
   one or more load balancing filters distributing the translation request among the aggregate filters to increase the speed of the teletranslation system and optimizing the computing power of the network.

10. The network-based filter architecture as recited in claim 9, wherein the aggregate filters comprise one or more atomic filters.

11. The network-based filter architecture as recited in claim 9, wherein the aggregate filters comprise one or more aggregate filters.

12. The network-based filter architecture as recited in claim 9, wherein the aggregate filters comprise one or more load-balancing filters.

13. The network-based filter architecture as recited in claim 9, wherein the aggregate filters comprise a combination of one or more atomic, aggregate and load-balancing filters.

14. A method for translating documents from one natural language to another by a network-based teletranslation system, comprising the steps of:
   receiving translation documents at a client application layer having a plurality of client applications and outputting translated documents;
   calling a plurality of filters at a server layer in an appropriate order based on the translation documents and existing parameters, the server layer having a plurality of filters;
   preprocessing the translation documents at the filters to facilitate further preprocessing by subsequent filters;
   translating the translation documents at a machine translation engine in the server and returning the translated documents; and
   arbitrating the translation documents by an intermediate layer among the filters.

15. The method as recited in claim 14, further comprising the step of distributing the translation documents among various filters in order to minimize translation times.

16. A method for translating documents from one natural language to another natural language by a network-based filter architecture embodied in a teletranslation system, the filter architecture utilizing a computing power of the network in a scalable and flexible way, the method increasing a bandwidth of the teletranslation system by distributing the documents among various filters in the network, the method comprising the steps of:

performing specific tasks by one or more atomic filters;

analyzing translation request documents by one or more aggregate filters and calling other filters; and distributing the translation request documents by one or more load-balancing filters among the aggregate filters to optimize the computing power of the network.

17. The method as recited in claim 16, wherein the aggregate filters comprise one or more atomic filters.

18. The method as recited in claim 16, wherein the aggregate filters comprise one or more aggregate filters.

19. The method as recited in claim 16, wherein the aggregate filters comprise one or more load-balancing filters.

20. The method as recited in claim 16, wherein the aggregate filters comprise a combination of one or more atomic, aggregate and load-balancing filters.

21. A program storage device readable by a machine, tangibly embodying a program of instructions executable by the machine to perform method steps of translating documents from one natural language to another by a network-based teletranslation system, the method comprising the steps of:

receiving translation documents at a client application layer having a plurality of client applications and outputting translated documents;

calling a plurality of filters at a server layer in an appropriate order based on the translation documents and existing parameters, the server layer having a plurality of filters;

preprocessing the translation documents at the filters to facilitate further preprocessing by subsequent filters;

translating the translation documents at a machine translation engine in the server and returning the translated documents; and arbitrating the translation documents by an intermediate layer among the filters.

22. The program storage device as recited in claim 21, wherein the intermediate layer comprises one or more atomic filters.

23. The program storage device as recited in claim 21, wherein the intermediate layer comprises one or more aggregate filters.

24. The program storage device as recited in claim 21, wherein the intermediate layer comprises one or more load-balancing filters.

25. The program storage device as recited in claim 21, wherein the intermediate layer comprises a combination of one or more atomic, aggregate and load-balancing filters.

* * * * *